(12) United States Patent
Bauer et al.

(10) Patent No.: US 9,140,165 B2
(45) Date of Patent: Sep. 22, 2015

(54) METHOD FOR OPERATING A DELIVERY UNIT FOR A REDUCING AGENT AND MOTOR VEHICLE HAVING A DELIVERY UNIT

(71) Applicant: Emitec Gesellschaft fuer Emissionstechnologie mbH, Lohmar (DE)

(72) Inventors: Peter Bauer, Immenreuth (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 282 days.

(21) Appl. No.: 13/632,521

(22) Filed: Oct. 1, 2012

(65) Prior Publication Data

US 2013/0025268 A1     Jan. 31, 2013

Related U.S. Application Data

(63) Continuation of application No. PCT/EP2011/054311, filed on Mar. 22, 2011.

(30) Foreign Application Priority Data

Apr. 1, 2010 (DE) .......................... 10 2010 013 695

(51) Int. Cl.
    *F01N 3/00*      (2006.01)
    *F01N 3/20*      (2006.01)

(52) U.S. Cl.
    CPC .............. *F01N 3/208* (2013.01); *F01N 2610/02* (2013.01); *F01N 2610/1466* (2013.01);
                (Continued)

(58) Field of Classification Search
    CPC ................. F01N 3/208; F01N 2610/02; F01N 2610/1466; F01N 2610/1473; F01N 2900/1808; F01N 2900/1811; F01N 2900/1822; F01N 2900/0422; Y02T 10/24
    USPC ....................................................... 60/272–324
See application file for complete search history.

(56) References Cited

U.S. PATENT DOCUMENTS

5,994,787 A    11/1999   Hibino
6,539,708 B1 *   4/2003   Hofmann et al. ............... 60/286
(Continued)

FOREIGN PATENT DOCUMENTS

DE          19913477 A1     10/2000
DE       102004053124 A1     7/2005
(Continued)

OTHER PUBLICATIONS

International Search Report of PCT/EP2011/054311, Dated June 28, 2011.

*Primary Examiner* — Jesse Bogue
(74) *Attorney, Agent, or Firm* — Laurence A. Greenberg; Werner H. Stemer; Ralph E. Locher

(57) ABSTRACT

A method for operating a reducing agent delivery unit having a tank, a feed line running from the tank to an addition point, a return line branching off from the feed line and a valve to be activated with an electrical current for closing off the return line, includes initially applying an activation current to the valve for a first time interval. Subsequently, a holding current is applied to the valve when the first time interval has elapsed. Then, an operating variable of the delivery unit is determined and at least the activation current, the holding current and/or the first time interval are adapted as a function of the determined operating variable. A motor vehicle having a delivery unit is also provided.

8 Claims, 2 Drawing Sheets

(52) U.S. Cl.
CPC . *F01N2610/1473* (2013.01); *F01N 2900/0422* (2013.01); *F01N 2900/1808* (2013.01); *F01N 2900/1811* (2013.01); *F01N 2900/1822* (2013.01); *Y02T 10/24* (2013.01); *Y10T 137/0318* (2015.04)

(56) References Cited

U.S. PATENT DOCUMENTS

| | | |
|---|---|---|
| 6,966,300 B2 | 11/2005 | Fukuda |
| 7,509,931 B2 * | 3/2009 | Degner et al. ............ 123/90.11 |
| 7,775,036 B2 | 8/2010 | Barcin |
| 8,122,709 B2 | 2/2012 | Buerglin et al. |
| 8,171,721 B2 * | 5/2012 | Boddy et al. .................... 60/286 |
| 8,234,854 B2 * | 8/2012 | Kesse et al. ..................... 60/286 |
| 8,250,855 B2 | 8/2012 | Kleinknecht |
| 2008/0092891 A1 * | 4/2008 | Cewers .................... 128/204.18 |
| 2009/0025373 A1 | 1/2009 | Buerglin et al. |
| 2010/0064668 A1 | 3/2010 | Beckmann et al. |
| 2010/0242439 A1 * | 9/2010 | Domon et al. .................... 60/274 |
| 2011/0120559 A1 | 5/2011 | Kaluza et al. |
| 2011/0146241 A1 | 6/2011 | Hodgson et al. |
| 2013/0160431 A1 * | 6/2013 | Tsumagari ....................... 60/274 |

FOREIGN PATENT DOCUMENTS

| | | |
|---|---|---|
| DE | 102004016554 A1 | 10/2005 |
| DE | 10 2005 002 318 A1 | 7/2006 |
| DE | 10 2006 012 855 A1 | 9/2007 |
| DE | 102006019051 A1 | 10/2007 |
| DE | 10 2006 059 625 A1 | 6/2008 |
| DE | 10 2007 017 458 A1 | 10/2008 |
| DE | 10 2007 017 459 A1 | 10/2008 |
| DE | 102008010106 A1 | 8/2009 |
| DE | 10 2008 030 756 A1 | 1/2010 |
| JP | H1094192 A | 4/1998 |
| JP | 2003269644 A | 9/2003 |
| JP | 2005291213 A | 10/2005 |
| WO | 2009103569 A1 | 8/2009 |

* cited by examiner

METHOD FOR OPERATING A DELIVERY UNIT FOR A REDUCING AGENT AND MOTOR VEHICLE HAVING A DELIVERY UNIT

CROSS-REFERENCE TO RELATED APPLICATION

This is a continuation, under 35 U.S.C. §120, of copending International Application No. PCT/EP2011/054311, filed Mar. 22, 2011, which designated the United States; this application also claims the priority, under 35 U.S.C. §119, of German Patent Application DE 10 2010 013 695.6, filed Apr. 1, 2010; the prior applications are herewith incorporated by reference in their entirety.

BACKGROUND OF THE INVENTION

Field of the Invention

The invention relates to a method for operating a delivery unit for reducing agent. A delivery unit suitable for this purpose has a feed line, which runs from a tank to an addition point (for example at an exhaust line of a motor vehicle) and a return line which branches off from the feed line, back into the tank. The return line may generally be opened and/or closed off by a valve which can be activated with an electrical voltage, in such a way that a flow of reducing agent from the feed line to the return line can be interrupted or prevented or produced in a targeted manner. The invention also relates to a motor vehicle having a delivery unit.

Such delivery units or dosing units may be used, for example, together with devices for the purification of the exhaust gases of internal combustion engines. In particular, such delivery units are used in exhaust-gas treatment devices which are suitable for selective catalytic reduction [SCR]. It is possible, with selective catalytic reduction, for nitrogen oxide compounds ($NO_x$) in the exhaust gas to be reduced in an effective manner. A reducing agent is supplied to the exhaust gas for this purpose. Ammonia, for example, is used as a reducing agent. In particular, in the case of exhaust-gas treatment devices for mobile internal combustion engines, ammonia should not be stored directly but rather in the form of a reducing agent precursor for safety reasons. A reducing agent precursor of that type is, for example, 32.5% urea-water solution which can be converted to form ammonia and which is available, for example, under the trademark "AdBlue." However, the storage of a urea-water solution likewise leads to problems because it freezes at temperatures below −11° C. A further known reducing agent precursor is Denoxium which remains liquid even at temperatures below −11° C. There is nevertheless the same problem there, too, at lower temperatures. Where the expression "reducing agent" is used below, it also means, in particular, a reducing agent precursor and/or a reducing agent precursor solution.

Specifically in the case of motor vehicles, temperatures below −11° C. may be encountered, for example, if the motor vehicles have had long standstill periods between individual operational phases. The tank and the delivery unit for the urea-water solution must therefore be constructed so as to withstand the freezing of reducing agent in the interior thereof without being destroyed by the ice pressure which is generated. It is thus advantageous for a return line to be provided for the delivery unit. The return line may be closed off by a valve during operation. In standstill situations, the ice pressure generated in the delivery unit can be dissipated through the return line if the valve is open then. At the same time, a closable return line permits the discharge of air and/or gas bubbles and/or solid matter (for example small fragments of ice) from the delivery unit and the associated lines, such as may arise during the freezing or thawing of the reducing agent in the interior of the delivery unit. In order to ensure that the delivery unit can reliably provide (in particular only liquid) reducing agent in an exactly predefined quantity and/or at an exactly predefined pressure, it is important for as few air bubbles as possible to be present in the delivery unit and in the associated lines.

There is normally only a limited amount of electrical energy available in a motor vehicle. For that reason, it is advantageous if the delivery unit can be operated with little energy. In particular, the closable valve in the return line constitutes an energy consumer. In order to ensure that ice pressure can be dissipated when the motor vehicle is at a standstill, the valve must be opened. A valve must therefore be used which is open when no supply voltage is applied. Conversely, for the operation of the delivery unit, it is then necessary for an operating voltage to be applied to the valve, and therefore for energy to be consumed.

SUMMARY OF THE INVENTION

It is accordingly an object of the invention to provide a method for operating a delivery unit for a reducing agent and a motor vehicle having a delivery unit, which overcome the hereinafore-mentioned disadvantages and further alleviate the highlighted technical problems of the heretofore-known units and motor vehicles of this general type. It is sought, in particular, to describe a method for particularly energy-saving operation of a delivery unit which has an electrically activatable valve.

With the foregoing and other objects in view there is provided, in accordance with the invention, a method for operating a delivery unit for reducing agent. The delivery unit has a feed line running from a tank to an addition point, a return line branching off from the feed line, and a valve configured to be activated with an electrical current for switching over the return line. The method comprises at least the following steps:
  a) applying an activation current to the valve for a first time interval;
  b) applying a holding current to the valve when the first time interval has elapsed;
  c) determining an operating variable of the delivery unit; and
  d) adapting at least one of the following variables as a function of the determined operating variable:
    the activation current;
    the holding current;
    the first time interval.

The method according to the invention is based on the consideration that a lower operating voltage is required for maintaining an activated position than for the transition from an initial position into the activated position of the valve. In the initial position, the valve is in each case either open or closed. In the activated position, the respective other state (closed or open) is then present. Within the context of the invention, a switchover of the valve means that the valve is transferred either from a closed state into an open state or from an open state into a closed state. This is dependent on the type of valve. In order to ensure that the transition into the activated position can take place reliably, the higher operating voltage required for this purpose (the activation current) must be applied for a certain period of time (the first time period). Thereafter, a lower current or a lower voltage for maintaining the activated position (the holding current) can be applied, as an operating current, to the valve. As an alternative to the activation current and the holding current, it is also possible within the context of the present invention for an activation voltage and a holding voltage to be defined. Voltage and current are linked to one another by Ohm's law, in such a way that the current is always approximately proportional to the associated voltage. If appropriate, through the use of a regulator, an adaptation of current and/or voltage may take place in such a way that in each case a desired voltage or a desired current is present.

With regard to the construction of the correspondingly configured device, reference is made to the introduction and to the explanations given below. It should be noted that the feed line permits a transportation of (liquid) reducing agent away from the tank (to a buffer storage device, an injector, a filter, a dosing unit, an evaporator, a reaction chamber, a mixing chamber, etc.) and the return line permits a transportation of the reducing agent from a (single) point of the feed line back to the tank.

In order to carry out the electric operation of the valve, a corresponding voltage or current source is provided, along with a controller which effects corresponding operation of the valve. Even though a single valve and/or a single return line is sufficient in most cases, the invention may also be used correspondingly with a multiplicity of valves and/or return lines.

In accordance with another particularly advantageous mode of the method of the invention for operating the delivery unit, the valve has a movable armature which can be moved from an initial position into an activated position by the activation current and can be held in the activated position by the holding current. If an electrical voltage is applied to the valve, an electrical current flows through an exciter coil provided in the valve. An exciter coil of the valve thus generates a magnetic force, which acts on the armature in the valve. The armature can be moved in this way. The movable armature may, in particular, be a piston or a diaphragm. It is also possible for both a piston and also a diaphragm to be provided, and for a force and a movement to be transmitted from the piston to the diaphragm through a transmission fluid. Consequently, it is proposed herein, in particular, that the exciter coil be activated through the use of the activation current in such a way that the armature undergoes a change in position, and is subsequently held stationary in the desired activated position through the use of the holding current.

In accordance with a further mode of the method of the invention, the valve has a movable armature, a spring and an exciter coil, and the exciter coil can move the movable armature counter to a spring force of the spring. A reactive element is thus additionally provided in this case, which element counteracts the force generated by the exciter coil and moves the armature of the valve back into the initial position. The reactive element may, for example, be a spring. When no operating voltage or too low an operating voltage is applied to the valve, the reactive element moves the armature back into the initial position. Through the use of the exciter coil and the described reactive element together, it is thus possible for the armature of the valve to be moved back and forth between the initial position and the activated position.

The armature normally opens up or closes off a duct for a medium. When the duct is opened up, the valve is open. When the duct is closed off, the valve is closed.

It is desirable for the activation current to be as low as possible and to have to be applied for as short a first time interval as possible in order to move the armature of the valve from the initial position into the activated position. Furthermore, the holding current for maintaining the activated position should be as low as possible. It is thus possible for the energy consumption of the valve to be kept low.

An example for the procedure of the method is specified herein, as an example for the method according to the invention:

An activatable solenoid valve may be used as a valve. In step a), an activation current of between 400 mA [milliamperes] and 1000 mA, preferably approximately 700 mA, can be applied to the valve. The activation current is applied in step a) for a first time interval of between 0.5 s [seconds] and 2 s, preferably approximately 1 s. Subsequently, in step b), a holding current of between 20 mA [milliamperes] and 500 mA, preferably between 200 mA and 300 mA, is applied. If appropriate, the holding current is now varied within step b). For example, the holding current is reduced continuously (if appropriated in stages) in the manner of an iteration (in particular stepwise or repeatedly). This can be done, for example, in steps of 2 mA [milliamperes] to 20 mA in each case. At the same time, in step c), it may be monitored as to whether or not leakage of the valve occurs. If leakage of the valve occurs, a minimum required holding current for preventing leakage is defined in step d). The minimum required holding current may, for example, be higher than the defined holding current by a predefined difference of, for example, between 10 mA [milliamperes] and 50 mA. The method according to the invention is subsequently started anew.

Through the use of the method according to the invention, the activation current, the holding current and/or the first time interval can be adapted to relevant operating variables of the delivery unit. It is possible for the activation current, the first time interval and/or the holding current to be varied in such a way that relevant operating variables of the delivery unit lie in an acceptable range, so that fault-free operation of the delivery unit is ensured and at the same time the energy consumption of the valve is as low as possible.

In accordance with an added particularly advantageous mode of the method of the invention, step c) takes place at least as a function of a determined operating variable of the delivery unit, wherein the operating variable includes at least one of the following parameters:

pressure of the reducing agent in the delivery unit;
delivery rate of a delivery pump assigned to the delivery unit;
characteristic current profile of a delivery pump assigned to the delivery unit;
leakage from the delivery unit;
temperature of the reducing agent in the delivery unit;
temperature of a component in the delivery unit.

With this improvement of the method, it is achieved, in particular, that monitoring or even diagnosis of at least some of these operating variables of the delivery unit takes place, and the operation of the delivery unit can be manipulated in a targeted manner (directly and/or approximately simultaneously and/or in a regulated manner) through the operation of the valve.

If the holding current, the activation current and/or the first time interval are too low/short for the presently or actually prevailing conditions, a sufficient pressure build-up in the delivery unit is not possible because a pressure loss occurs through the return line in parallel with the pressure build-up by the pump. It is therefore advantageous for the holding current, the activation current and/or the first time interval to be adapted to the pressure in the delivery unit.

The delivery rate or the delivery volume of the delivery unit is generally increased if the holding current, the activation current and/or the first time interval are too low/short, because a loss of delivery rate occurs through the return line. It is therefore advantageous for the activation current, the holding current and/or the first time interval to be increased if the actual delivery rate is presently increased in relation to an expected and/or predefined delivery rate. If the first time interval is too short and/or the activation current is too low, the switchover process of the valve into the activated state possibly takes place incompletely. If the holding current is too low, the valve is not held in the switched-over state after the activation.

It is possible to infer the pressure build-up and/or the delivery rate of a delivery pump from the characteristic current profile of the delivery pump which is assigned to the delivery unit. It is thus also possible for the activation current, the holding current and/or the first time interval to be adapted directly to the characteristic current profile of a delivery pump of that type. A delivery pump of that type may be a reciprocating-piston pump or a diaphragm pump with a pump chamber and a movable pump piston. The piston is moved back and forth by an electromagnetic coil. The characteristic current profile of a delivery pump is generated when a predetermined voltage signal is applied to the delivery pump. The voltage signal may be a rectangular voltage signal. Alternatively, the voltage signal may, like the voltage signal for the method according to the invention, be divided into a plurality of chronological phases of different voltage. It is possible, for example, for an acceleration voltage for accelerating the pump piston and a (different) movement voltage for moving the pump piston to be provided. It is possible to infer the delivery rate of the pump and the pressure build-up in the delivery unit from the characteristic current profile, through the movement of the pump piston and the resistance of the medium in the pump.

Both the pressure build-up in the delivery unit and also the delivery rate of the pump are possibly also related to a (desired or undesired) leakage from the delivery unit (including the associated lines). The leakage is the cause for an increased delivery rate of the delivery pump without correspondingly increased transportation to the desired destination, and impaired pressure build-up. One possible position for leakage is an incompletely closed valve in the return line. An incompletely closed valve may be the result of too low a holding current, too low an activation current and/or too short a first time interval. It is therefore expedient for the holding current, the activation current and/or the first time interval to be adapted to a leakage of the delivery unit and, in particular, to a leakage at the valve in the return line.

If a leakage has been detected, the method according to the invention should be started anew in order to ensure that, in particular, step a) of the method is carried out anew. If leakage occurs, the valve is not fully switched over. The holding current which has been set too low is, however, not capable of moving the valve into the fully switched-over state. For this reason, in step a), the activation current which ensures a complete switchover of the valve should be applied anew.

It is also advisable for the activation current, the holding current and/or the first time interval to be adapted to a temperature measured in the reducing agent and/or on a component of the delivery unit. The electrical characteristics and, in particular, the electrical resistance of a valve may be dependent on the temperature, such that it is particularly advantageous for the activation current, the holding current and/or the first time interval to be adapted to a temperature of the valve or of a component disposed in the vicinity of the valve. The viscosity of the reducing agent is also at least partially dependent on the temperature of the reducing agent. The holding currents, activation currents or first time intervals required may change due to a changed viscosity of the reducing agent. For example, an increased viscosity may hinder the movement of the valve. It is therefore advantageous for the activation current, the first time interval and/or the holding current to be adapted to the temperature of the reducing agent.

In accordance with an additional advantageous mode of the method of the invention, the method is carried out repeatedly and an adaptation of at least one of the following variables to an aging-induced change of the valve is carried out:
  the activation current;
  the holding current;
  the first time interval.

Even though the adaptation could be carried out jointly during the course of step c), it is preferable in this case for the adaptation to be carried out not during every operation of the valve but rather only at predefined points in time. Such points in time may be a first start-up, servicing times, mileage limits, etc.

An aging-induced change of the valve may, for example, result in the effect of the valve on the delivery rate of the delivery unit, and/or a leakage flow through the valve, being increased. For example, the armature of the valve and/or the contact area of the valve for the armature may change as a result of operation, in such a way that a leakage flow through the valve is generated. It is, however, possible for such wear of the valve to be at least partially compensated for by an increased holding current, in such a way that a leakage flow is prevented or at least reduced to such an extent that fault-free operation of the delivery unit can nevertheless be ensured. It is also possible that the force imparted by a restoring element of the valve changes over time. The restoring element may, for example, be a spring which ages and eventually imparts a lower spring force. It is now possible for the activation current, the first time interval and/or the holding current to be reduced, and for fault-free operation of the delivery unit to nevertheless be ensured.

In accordance with yet another likewise advantageous mode of the invention, the method is carried out upon a first start-up of the delivery unit, and an adaptation of at least one of the following variables to individual characteristics of the valve resulting from production tolerances is carried out:
  the activation current;
  the holding current;
  the first time interval.

Valves from a production series generally differ because absolutely exact production is often not possible. It is possible for such fluctuations in production quality to be utilized to further reduce the energy consumption for a delivery unit. It may be the case that, to hold the valve in the activated position in different valves of the same type or of the same type series, different holding currents are required. The activation currents may also differ. This may, for example, result from the fact that the spring force of a spring which pushes or pulls the armature of the valve back into the initial position may vary. In this respect, it is proposed herein that in fact the individual characteristics of the valve be determined, and that specifications for the adaptation of the operating variables be predefined specifically for the individual valve.

With regard to the variation of the delivery unit as a result of aging and with regard to the production tolerances, the adaptation within the context of the method according to the invention preferably takes place in a self-adapting manner. That is to say, within the context of the adaptation, no individual setting-up or programming of different delivery units takes place from a production line, but rather the adaptation is carried out substantially automatically. In particular, deviations of the delivery units within the production tolerances during manufacture are not monitored. The adaptation to differences of the delivery units within the production tolerances takes place in a self-adapting manner or automatically, without such monitoring taking place. Variations due to aging are usually not even detectable because the aging of the delivery unit occurs during operation, and a renewed measurement of the delivery unit normally does not take place during operation. It is therefore necessary, in particular in the case of an adaptation due to aging, for the adaptation to take place in a self-adapting manner or automatically.

In accordance with yet a further particularly advantageous mode of the method of the invention, in step b), the holding current is reduced to such an extent that leakage from the delivery unit is detected in step c), and then in step d), the holding current is set so as to be higher by a predefined interval than the holding current which was reduced in step b). The predefined interval (in particular an interval of the voltage increase) should be selected in such a way that the holding current set in step d) ensures with sufficient certainty that no further leakage from the delivery unit occurs thereafter. In this way, it is possible for the energy demand of the valve for maintaining the activated position of the valve to be reduced to a particularly great extent.

In a further advantageous embodiment of the method, an activation current is applied to the valve in step a), and in step c) it is checked, through the use of one of the relevant parameters, whether or not that activation current was sufficient to actuate the valve. For example, it may be checked whether or not a leakage flow through the valve is generated. In step d), the activation current is then adapted correspondingly. If the valve has been actuated as desired, the activation current is reduced further. If the activation current was too low to actuate the valve, the activation current is increased again by a predefined suitable interval, in such a way that a successful activation of the valve is ensured with adequate certainty. The method can also be applied to the duration of the first time interval, wherein through the use of a corresponding method implementation, the first time interval can be selected to be particularly short.

In accordance with yet an added particularly advantageous mode of the method of the invention, the activation current and the holding current are generated from a system voltage through a pulse width manipulation. In the on-board power system of the motor vehicle, a voltage is normally available which fluctuates by a few volts, which results, for example, from the power of a generator connected to the internal combustion engine and from a battery provided for storing electrical energy. However, for the activation according to the invention of a valve in the delivery unit, operation with very precise specifications for the respective operating voltage is preferable. An exact voltage which is lower than an initial voltage may be generated, for example, through pulse width manipulation. Through the use of pulse width manipulation, it is possible to generate different voltages using a single electrical circuit. Two different operating voltages, the activation current and the holding current, are required for the method according to the invention. Therefore, pulse width modulation is particularly well suited to the method proposed herein.

In accordance with yet an additional advantageous mode of the method of the invention, a free-wheeling diode is connected in parallel with the activatable valve and a deactivation of the holding current takes place after step d). During the deactivation of a valve (in particular of a magnetically operated valve), the electrical energy stored in the valve (or in the magnets of the valve) flows back after the deactivation and generates a short voltage peak which can lead to damage to electronic components. That voltage peak can be successfully prevented through the parallel connection of the valve with a free-wheeling diode or a protective diode. In particular, if the method according to the invention is carried out frequently and multiple times in rapid succession, it is thus possible for disturbing influences of preceding method cycles (steps a) to d)) to be effectively eliminated.

With the objects of the invention in view, there is concomitantly provided a motor vehicle, comprising an internal combustion engine and an exhaust system for purification of exhaust gases of the internal combustion engine. The motor vehicle has a delivery unit with a feed line which runs from a tank to an addition point and a return line which branches off from the feed line. The return line can be closed off by a valve which can be activated with an electrical voltage. The motor vehicle has a controller which is set up, configured or programmed for operating the delivery unit in accordance with a method of the invention.

The controller may also be jointly integrated into the engine controller of the motor vehicle, so that a separate component need not be provided for the control of the delivery unit. The method may, for example, be integrated as software into the controller. The controller may furthermore interact with suitable (calculated and/or stored) data models, sensors, etc., in order to perform an up-to-date adjustment or adaptation of the operation of the valve.

Other features which are considered as characteristic for the invention are set forth in the appended claims, noting that the features specified individually in the claims may be combined with one another in any desired technologically meaningful way and may be supplemented by explanatory facts from the description, with further structural variants of the invention being specified.

Although the invention is illustrated and described herein as embodied in a method for operating a delivery unit for a reducing agent and a motor vehicle having a delivery unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
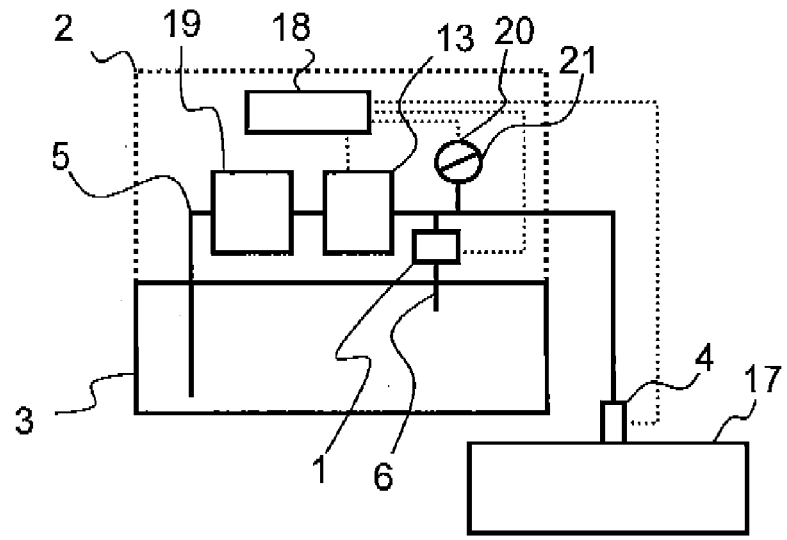
FIG. 1 is a diagrammatic, vertical-sectional view of a delivery unit configured for performing the method according to the invention.

Referring now to the figures of the drawings in detail and first, particularly, to FIG. 1 thereof, there is seen a delivery unit 2 (or a complete dosing unit with an injector into an exhaust system 17) for a liquid reducing agent such as, for example, a urea-water solution. The delivery unit 2 delivers reducing agent from a tank 3 to an addition or metering-in point 4. The reducing agent is delivered from the tank 3 to the addition point 4 through a feed line 5. A filter 19 and a delivery pump 13 are disposed in the feed line 5, as seen in a flow direction of the reducing agent. A single return line 6 branches off from the feed line 5 downstream of the filter 19 and the delivery pump 13, as viewed from the tank 3. The return line 6 can be closed off through the use of an electrically operable valve 1. A pressure sensor 20 and a temperature sensor 21 are situated in the feed line 5 between the delivery pump 13 and the addition point 4. The pressure sensor 20 and the temperature sensor 21 may be realized either separately from one another or in a common structural unit. The addition point 4 is set up or configured to dose reducing agent in predefined, if appropriate variable quantities into the exhaust system 17.

The method according to the invention is carried out by a controller 18. The controller is connected to the delivery pump 13, the pressure sensor 20, the temperature sensor 21 and the addition point 4, in order to process information or signals generated by those components and to define therefrom an activation current, a holding current and a first time interval for the valve 1, which is likewise connected to the controller 18.

Figure 2:
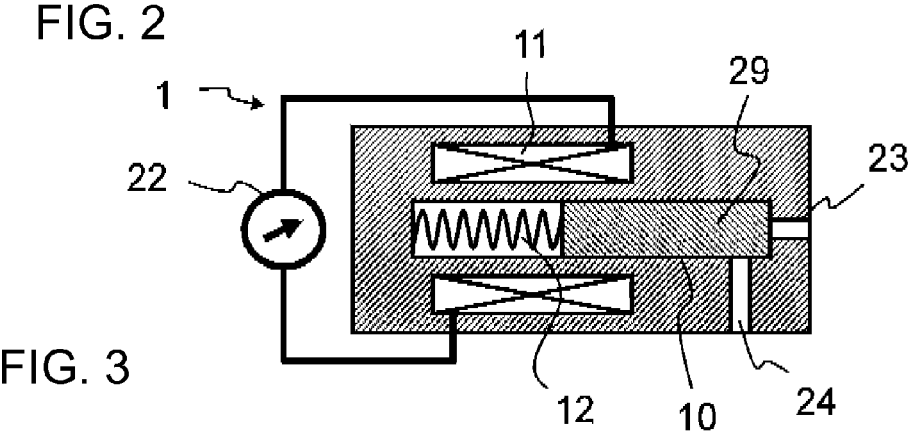
FIG. 2 is a longitudinal-sectional view of a valve which may be disposed in a delivery unit and through which the method according to the invention can be carried out.
Figure 3:
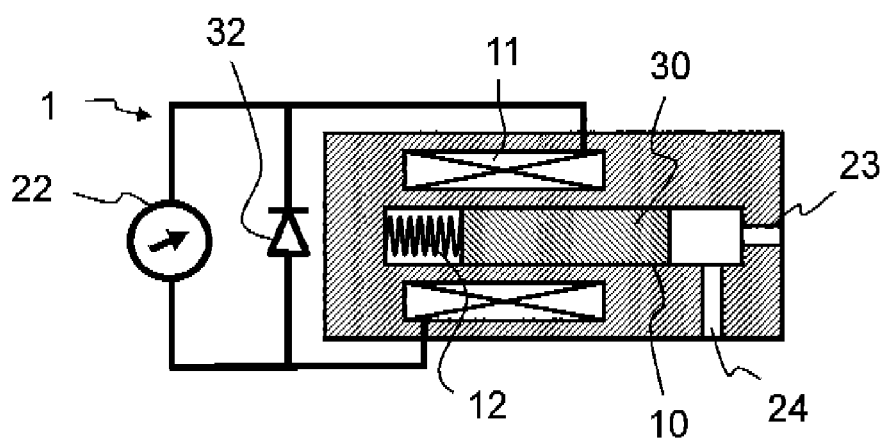
FIG. 3 is a further longitudinal-sectional view of the valve of FIG. 2.

FIG. 2 and FIG. 3 show an example of a valve 1 which can be used in a delivery unit for the method according to the invention. FIG. 2 shows the valve 1 in an initial position 29, and FIG. 3 shows the valve 1 in an activated position 30. In the initial position 29, a connection from an inlet duct 23 leading into the valve 1 to an outlet duct 24 leading out of the valve 1 is closed off. The reducing agent cannot flow from the inlet duct 23 through the valve 1 to the outlet duct 24. In the activated position 30, the connection from the inlet duct 23 leading into the valve 1 to the outlet duct 24 leading out of the valve 1 is open. The reducing agent can now flow from the inlet duct 23 through the valve 1 to the outlet duct 24. A movable armature 10 in each case closes and opens the connection from the inlet duct 23 to the outlet duct 24. The armature 10 is held in the initial position 29 through the use of a spring 12. The armature 10 can be moved counter to the force exerted by the spring 12 by an exciter coil 11, in such a way that the valve 1 can be transferred into the activated position 30. The exciter coil 11 is supplied with electrical energy by a voltage source 22. Additionally, FIG. 3 shows a free wheeling diode 32 in parallel with the activatable valve.

Figure 4:
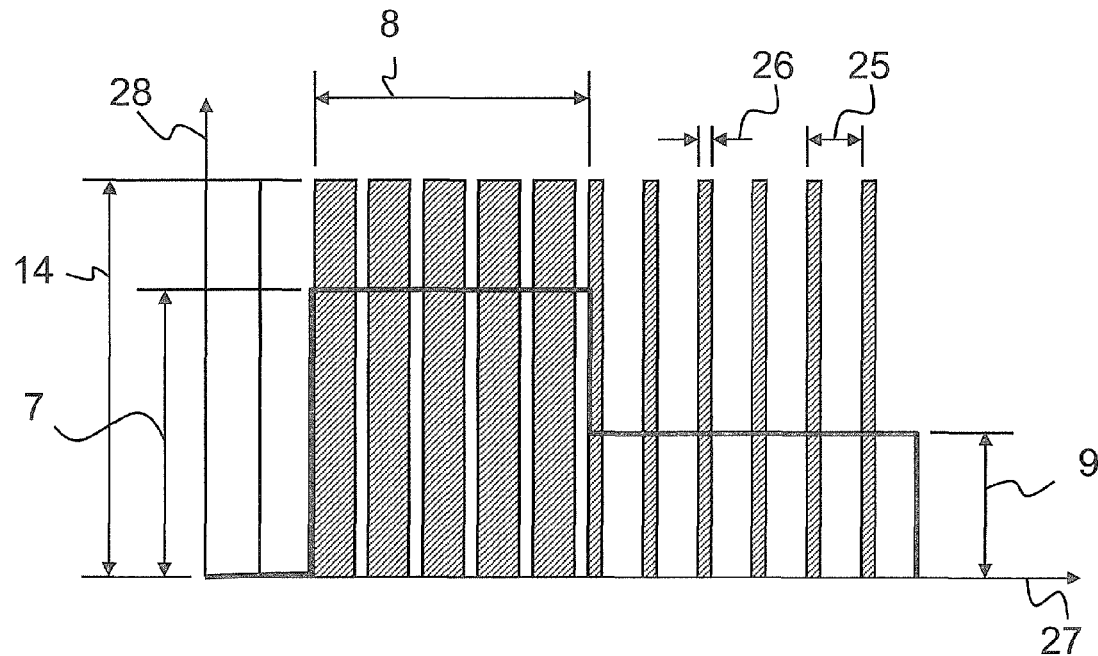
FIG. 4 is a graph of a voltage profile generated through pulse width modulation.

FIG. 4 diagrammatically illustrates how an activation voltage 7 and/or a holding voltage 9 can be generated from a present system voltage 14 by pulse width manipulation. In accordance with Ohm's law, the holding current is determined from the holding voltage 9, and the activation current is determined from the activation voltage 7, on the basis of the electrical resistance of the valve and of the other connected components. If appropriate, an adaptation of the activation voltage 7 and of the holding voltage 9 through regulation may take place, in which the activation voltage 7 and the holding voltage 9 are adapted in such a way that the desired activation current and the desired holding current are set exactly. In FIG. 4, a voltage profile over time is plotted on a voltage axis 28 against a time axis 27. Within the context of the pulse width modulation, a fixed pulse width 25 is predefined within which the system voltage 14 is pulsed with a variable pulse length 26. The pulsed system voltage 14 is applied to an electrical circuit set up for pulse width modulation. A fluctuating system voltage 14 may be compensated for through an adaptation of the pulse length 26. A correspondingly reduced voltage is attained at the output of the circuit as a function of the predefined pulse length 26. In the case of the method according to the invention discussed herein, that voltage is either the activation voltage 7 or the lower holding voltage 9. The activation voltage 7 is generated for a first time interval 8 for the method according to the invention. From then onward, the pulse length 26 is reduced, and the holding voltage 9 is generated.

Figure 5:
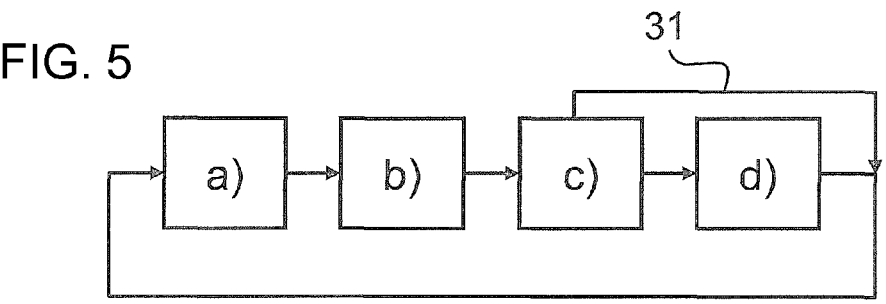
FIG. 5 is a flow diagram of the method according to the invention.

FIG. 5 shows a flow diagram of a preferred variant of the method according to the invention. Individual method steps a), b), c) and d) are run through repeatedly in the form of a loop. In particular, in the case of a method implementation of the method according to the invention, in which the activation current, the holding current and the first time interval are reduced to the greatest possible extent, in each case one control run-through 31 is possible upon the conclusion of the method according to the invention. During the course of that control run-through 31, no further adaptation of the activation current, of the holding current and of the first time interval takes place, but rather it is merely checked whether or not the operating parameters of the delivery unit with the present activation current, the present holding current and the present first time interval lie in the desired range. Step d) is accordingly omitted in the concluding control run-through.

Figure 6:
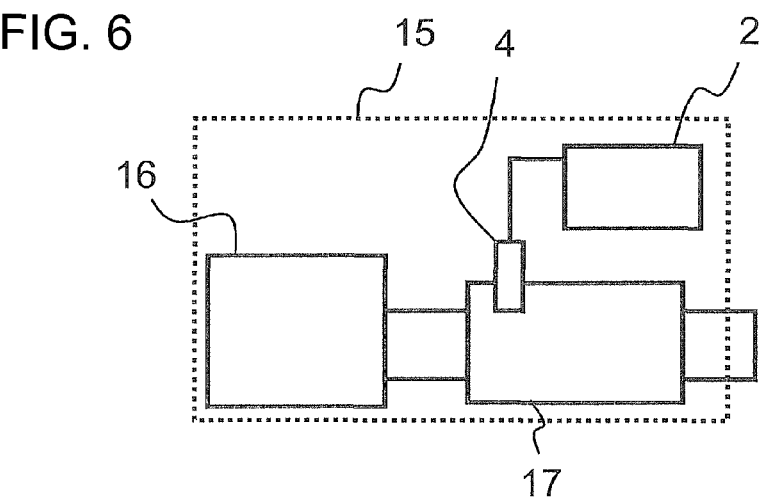
FIG. 6 is a sectional view of a motor vehicle having a delivery unit.

FIG. 6 shows a motor vehicle 15 having an internal combustion engine 16 and an exhaust system 17. The exhaust system 17 can be supplied with reducing agent from a delivery unit 2 through an addition point 4. The delivery unit 2 is a delivery unit which can be operated through the method according to the invention.

It is basically pointed out herein that the method may also be used correspondingly for other additives for motor vehicles which can be delivered through the use of a corresponding delivery unit with a feed line and a return line connectable by an electrically operable valve. Such (fluid) additives include, in particular, fuel, oxidation media or agents and the like. The addition point may, for this purpose, be relocated to addition points suitable for the additives, such as for example an intake region of the internal combustion engine or, in a targeted manner, upstream/downstream of an exhaust-gas treatment unit (filter, catalytic converter, mixer, etc.).

The invention claimed is:

1. A method for operating a delivery unit for delivering a reducing agent to an addition point, the method comprises the following steps:
   providing the delivery unit with a tank, a feed line running from the tank to the addition point, a return line branching off from the feed line and a valve configured to be activated with an electrical current for switching over the return line;
   a) applying an activation current to the valve for a first time interval;
   b) applying a holding current to the valve when the first time interval has elapsed;
   c) determining an operating variable of the delivery unit; and
   d) adapting at least one of the following variables as a function of the determined operating variable:
   the activation current;
   the holding current; or
   the first time interval;
   carrying out step c) by determining the operating variable as a function of at least one of the following parameters:
   a pressure of the reducing agent in the delivery unit;

a delivery rate of a delivery pump associated with the delivery unit;

a characteristic current profile of a delivery pump associated with the delivery unit;

a leakage from the delivery unit;

a temperature of the reducing agent in the delivery unit; or a temperature of a component in the delivery unit;

reducing the holding current in step b) to such an extent that leakage from the delivery unit is detected for step c); and then setting the holding current in step d) so as to be higher by a predefined interval than the holding current reduced in step b).

2. The method according to claim 1, which further comprises moving a movable armature of the valve from an initial position into an activated position with the activation current and holding the movable armature in the activated position with the holding current.

3. The method according to claim 1, which further comprises providing the valve with a movable armature, a spring and an exciter coil, and moving the movable armature with the exciter coil counter to a spring force of the spring.

4. The method according to claim 1, which further comprises carrying out the method repeatedly and carrying out an adaptation of at least one of the following variables to an aging-induced change of the valve:

the activation current;
the holding current; or
the first time interval.

5. The method according to claim 1, which further comprises carrying out the method upon an initial start-up of the delivery unit, and carrying out an adaptation of at least one of the following variables to individual characteristics of the valve, the individual characteristics resulting from production tolerances:

the activation current;
the holding current; or
the first time interval.

6. The method according to claim 1, which further comprises generating the activation current and the holding current from a system voltage using a pulse width manipulation.

7. The method according to claim 1, which further comprises connecting a free-wheeling diode in parallel with the activatable valve, and carrying out a deactivation of the holding current after step d).

8. A motor vehicle, comprising:

an internal combustion engine;

an exhaust system configured to purify exhaust gases of the internal combustion engine, said exhaust system having an addition point; and a delivery unit having a tank, a feed line running from said tank to said addition point, a return line branching off from said feed line, a valve to be activated with an electrical current for closing off said return line, and a controller configured to operate said delivery unit in accordance with the method of claim 1.

* * * * *